(12) United States Patent
Marti Mercade et al.

(10) Patent No.: US 7,374,032 B2
(45) Date of Patent: May 20, 2008

(54) MACHINE FOR RIGHTING AND ALIGNING ARTICLES USING DROP CHUTES COMPRISING MULTIPLE COMPARTMENTS

(75) Inventors: Alex Marti Mercade, Passatge Francesc Macia, 52, Sant Cugat Del Valles, Barcelona (ES) 08190; Jaime Marti Sala, Barcelona (ES)

(73) Assignee: Alex Marti Mercade, Barcelona (ES)

( * ) Notice: Subject to any disclaimer, the term of this patent is extended or adjusted under 35 U.S.C. 154(b) by 364 days.

(21) Appl. No.: 10/530,140

(22) PCT Filed: Oct. 3, 2002

(86) PCT No.: PCT/ES02/00467

§ 371 (c)(1),
(2), (4) Date: Oct. 18, 2005

(87) PCT Pub. No.: WO2004/031057

PCT Pub. Date: Apr. 15, 2004

(65) Prior Publication Data

US 2006/0124432 A1     Jun. 15, 2006

(51) Int. Cl.
   *B65G 47/24*     (2006.01)
(52) U.S. Cl. ........................... 198/400; 198/412
(58) Field of Classification Search ............. 198/396, 198/398, 400, 401, 406, 410, 412
See application file for complete search history.

(56) References Cited

U.S. PATENT DOCUMENTS

| 1,950,077 | A | * | 3/1934 | Benoit ................. 198/406 |
| 2,866,577 | A | * | 12/1958 | Dimond ................. 198/400 |
| 3,295,659 | A | | 1/1967 | Aldlin |
| 3,650,368 | A | | 3/1972 | Nalbach |
| 3,662,872 | A | | 5/1972 | Nalbach |
| 3,948,386 | A | * | 4/1976 | Nalbach ................. 198/400 |
| 4,949,834 | A | * | 8/1990 | Schindel ................. 198/400 |
| 6,435,333 | B1 | | 8/2002 | Sala |
| 6,557,691 | B2 | * | 5/2003 | Ronchi ................. 198/400 |

FOREIGN PATENT DOCUMENTS

| ES | 2049601 A2 | 4/1994 |
| ES | 2163957 A1 | 2/2002 |
| WO | WO 99/59904 A1 | 11/1999 |
| WO | WO 01/40084 A1 | 6/2001 |

OTHER PUBLICATIONS

International Search Report for PCT International Application No. PCT/ES02/000467, mailed Apr. 11, 2003.

\* cited by examiner

*Primary Examiner*—James R. Bidwell
(74) *Attorney, Agent, or Firm*—RatnerPrestia

(57) ABSTRACT

A machine for righting and aligning articles comprises at least one housing able to receive an article in a lying position, pre-oriented, and let it fall into a drop chute; end stop and support elements in the housing to hold a differentiated configuration of the article during its falling; a partition wall dividing the drop chute into two compartments; and a first diverter plate actuated to change position and direct the articles towards one and the other of the compartments, in an alternating manner. It includes two further partition walls dividing the two compartments into four subcompartments, each one for one article upright positioned, and a pair of second diverter plates actuated to change position and direct the articles towards one and other of said subcompartments, in an alternating manner.

14 Claims, 6 Drawing Sheets

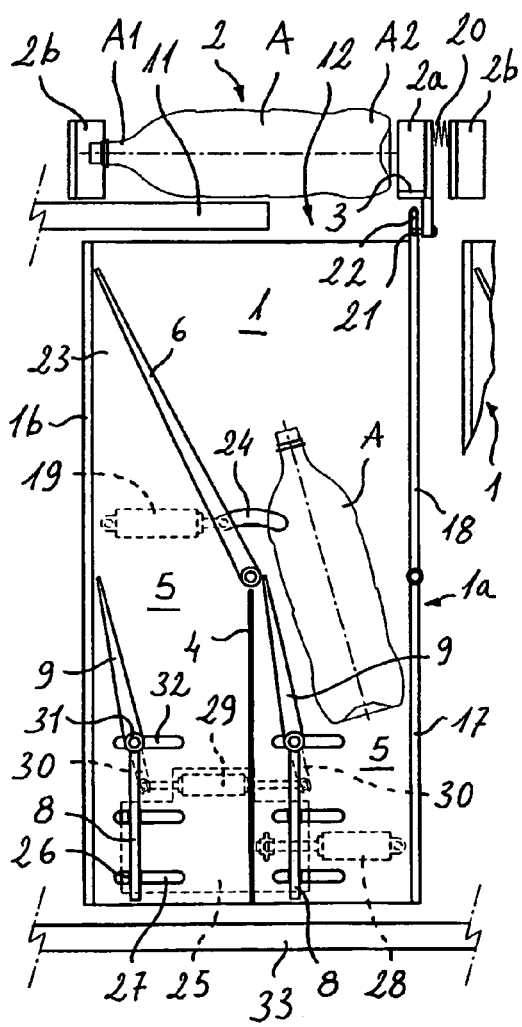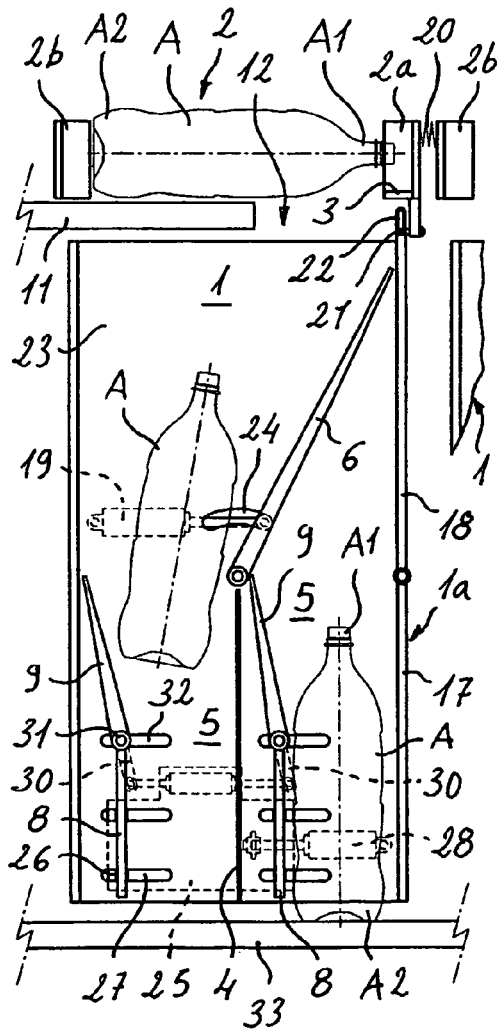

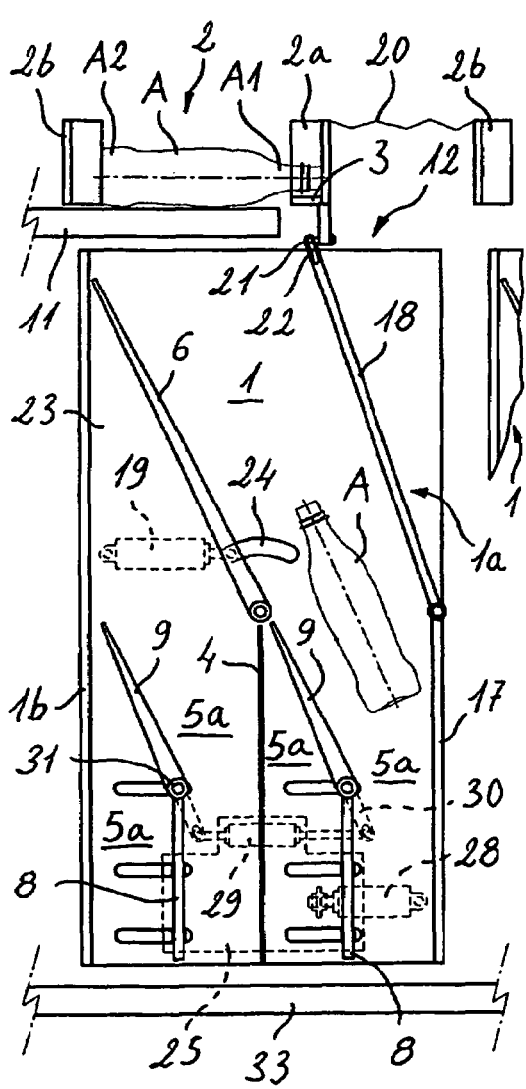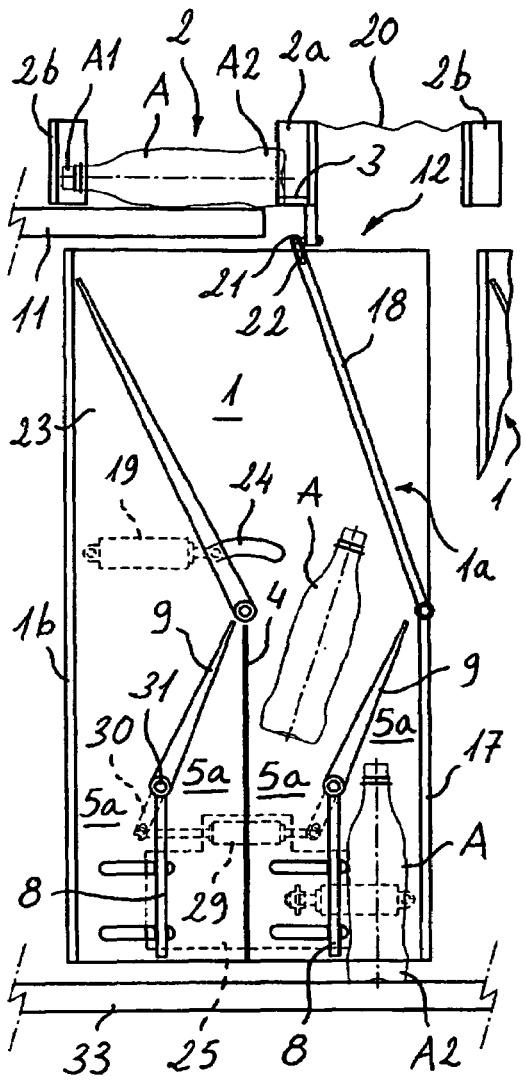

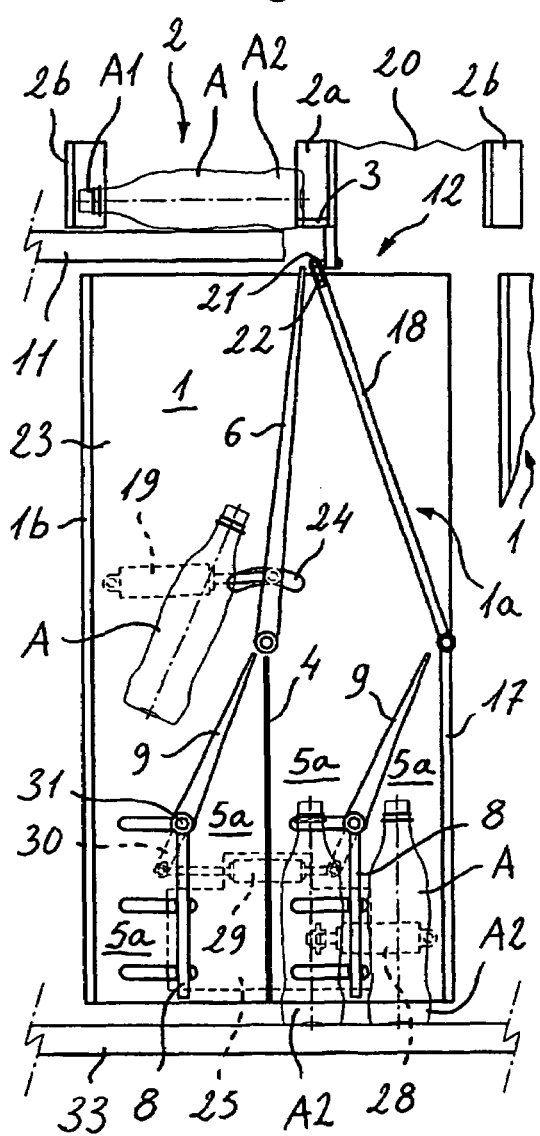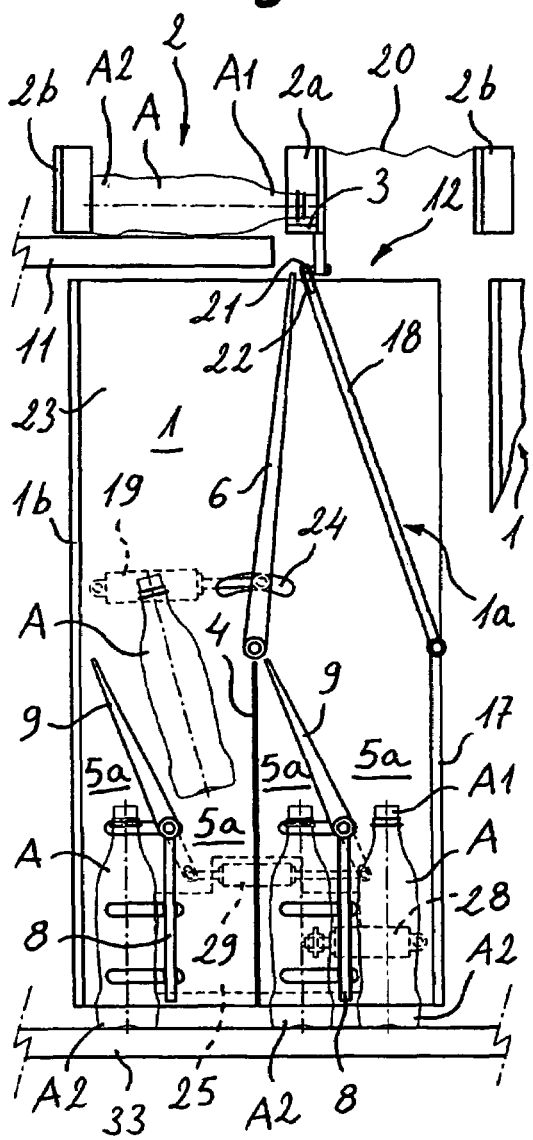

MACHINE FOR RIGHTING AND ALIGNING ARTICLES USING DROP CHUTES COMPRISING MULTIPLE COMPARTMENTS

This application is a U.S. National Phase Application of PCT International Application No. PCT/ES2002/000467, filed Oct. 3, 2002.

FIELD OF THE INVENTION

The present invention relates to a machine for righting and aligning articles using drop chutes comprising multiple compartments, and more particularly to a machine for righting articles having a differentiated configuration at one end and a base at the other end, such as empty light containers, which are fed to the machine in bulk in a disorderly arrangement and returned by the machine in a righted and orderly arrangement, for example in one or several rows.

BACKGROUND OF THE INVENTION

Machines for positioning initially disorderly arranged articles in a predetermined position and in an aligned arrangement are common in several industrial sectors. Machines for righting and arranging bottles or empty containers in an orderly manner and in an upright position, resting on their base and having the filling opening at their upper part, are used especially in the packaging sector art. Generally said filling opening forms a neck constituting a geometric shape differentiated from the bottle or container in an end located opposite to another end constituting a base, thus being defined an imaginary longitudinal axis between both ends.

U.S. Pat. No. 3,295,659 discloses an operating principle which has turned out to be the most commonly used in many kinds of machines for positioning articles, on the basis of the use of said differentiated geometric shape for righting the articles. Such a principle comprises first arranging the articles individually in a housing, so that the differentiated geometric shape faces one end or the other of the housing, and then dropping the article by gravity through the open bottom wall of the housing inside a drop chute whose funnel comprises end stop and support configurations intended for keeping said differentiated geometrical shape whichever its relative position with respect to the housing may be, in order that the article always falls on its base. For this purpose, at least one of said end stop configurations has such a shape that it forces the article to be placed differently in the drop chute funnel depending on said relative position of the differentiated shape, so that said shape is always located above one of said support configurations. The machine adopts a rotary shape in which a plurality of said cavities intended for receiving an article are arranged radially in the periphery of a circular structure.

U.S. Pat. No. 3,662,872 discloses a rotary positioning machine intended for bottles or empty light containers, wherein a series of housings are attached to the rotary structure, arranged tangentially in its periphery around a container that receives the articles in a disorderly arrangement and that is fitted with means for loading in each housing a container or a bottle in a flat position, having its longitudinal axis pre-oriented according to the tangential direction of the housing and having its neck either at the rear or at the front with respect to the rotation direction. Each of said housings has an open bottom wall over a drop chute which moves together with it. A stationary support plane comprising two interruptions in two opposite sections of the turn path is located between the open bottom walls of the housings and their respective drop chutes. Through said interruptions the articles fall by gravity inside the drop chute. Said end stops and supports, located in certain areas of said housings, are intended for holding said neck when the container falls inside the drop chute through said support plane interruption, so that the container is always in an upright position inside the drop chute, having its neck in the upper part and its base in its lower part. Finally a baffle means transfers the containers oriented in an upright position from the drop chutes to an exit conveyor. This machine further includes a partition wall that divides vertically a lower part of each drop chute into two equal compartments, and a diverter plate arranged in a hinged fashion in an upper end of said partition wall and actuated by actuating means so as to alternately change its position, in order to guide the articles falling at either of both compartments, the machine thereby being able to load during a whole turn two articles in each drop chute through the same peripheral housing.

Nevertheless, in this rotary positioning machine, the housings of entrance and the compartments of the drop chutes have appropriate fixed dimensions for articles of an only size. In order to adapt the machine to articles of different sizes it would be necessary to replace these housings and drop chutes, among other elements, which represents a high cost in time in the operation of substitution, a greater investment in the manufacture of the alternative elements and a greater cost of necessary storage for said elements.

U.S. Pat. No. 6,435,333 patent of the present applicant, discloses a rotary machine that obeys to the same principle although with a single interruption in the support plane and an only enclosure in each drop chute. Nevertheless, this machine is adapted to adjust to the handling of bottles or containers of different sizes by means of the incorporation of means for moving the end stops and supports located in the housings and destined to maintain the neck of the container when this one falls within the drop chute, as well as to move the sidewalls of the drop chute and other elements destined to fit the machine to articles of different sizes. All the movable elements of all the housings and drop chutes are displaced simultaneously by means of a relative angular displacement of a circular, coaxial substructure, to which these movable elements are fixed.

An object of the present invention is to provide a machine for righting and aligning articles by means of drop chutes with multiple compartments based on the mentioned principle to drop the articles in a drop chute, provided with four subcompartments in each drop chute.

Another object of the present invention is the one to provide a machine like the one described in the previous paragraph in which each drop chute includes two compartments and means to divide each one of these compartments into two subcompartments or to adjust automatically the housings of entrance, the compartments as well as the articles of different sizes.

DISCLOSURE OF THE INVENTION

The previous goals are achieved, according to the present invention, by providing a machine for righting and aligning articles using drop chutes comprising multiple compartments, said articles being of the type having a differentiated configuration at one end and a base at the other end. The machine is of the type comprising at least one drop chute arranged under a housing designed to receive from loading means an article in a flat position and with its longitudinal axis pre-orientated in relation with the longitudinal direction of said housing. From said housing, the article is let to fall in this position into said drop chute. Associated with this housing there are end stop and support elements to support said differentiated configuration of the article as it falls so that it is introduced in the upright position in the drop chute, in other words, with said base at the lowest level. These end stop and support elements are known per se and obey to the operation principle described in the above cited patents. In an also known manner, a partition wall divides a lower part of the drop chute into two compartments, being each one able to house one unit of the article upright positioned, and a first diverter plate is arranged in a hinged fashion on an upper end of said partition wall and is actuated by actuating means to change position in order to direct, in an alternating manner, the articles that fall towards one and the other of said compartments. Transfer means are included to transfer the article units, upright positioned, from said compartments to exit transport means in an aligned fashion.

The machine of the present invention is characterised in that it comprises adjustment means to adapt the housing dimensions, and/or the positions of said end stop and support elements existing therein, to different sizes articles. In accordance, the machine includes a pair of movable partition walls, each one arranged in the lower part of one of said compartments of the drop chute. Both movable partition walls are actuated by actuating means to laterally move in order to adapt the width of said compartments to said different sizes articles, in coordination with said adjustment means of the housing. One plate is arranged as to be able to hingedly pivot on an upper end of each one of said movable partition walls, and both plates are actuated by actuating means to change position. Thus, the partition walls are able to jointly move between a central position, in which each one divides the respective compartment into two equal subcompartments, each one capable of housing a smaller article and in which said second diverter plates are actuated in order to change position in an alternating manner so as to direct the articles that fall towards one and the other of said subcompartments, and at least one sideways position, in which each one adapts the width of the respective compartment to a bigger article, and in which said pivoting diverter plate remains stationary in a suitable position to direct the article unit that falls towards said adapted compartment.

As used herein, the expression "smaller article" means an article which transversal dimension is smaller than half a compartment of the drop chute, and therefore it admits the subdivision of itself into two equal subcompartments. In accordance, "bigger or medium-sized article" means an article which transversal dimension is bigger than half a compartment of the drop chute, in which case the adjustment of the width of said compartments is admitted but not its subdivision.

According to a preferred embodiment, the machine is of a rotatable type and comprises a series of said drop chutes and respective housings joined along the periphery of a rotary structure connected to actuating means to make it turn in a predetermined direction. The housings are tangentially arranged, i.e., the longitudinal axis of the articles housed therein is placed in a direction substantially tangential to the rotating trajectory they describe. The central part of the rotary structure comprises at least part of said means for loading the articles in the housings. The machine incorporates temporary retention means to retain the articles in the housings during a part of the rotating trajectory thereof and letting them fall into their respective drop chutes in one of several drop sections arranged along said rotating trajectory.

Preferably, these temporary retention means comprise at least one stationary support plane arranged between the housings, which have their bottom walls opened, and the drop chutes. Said stationary support plane is annular in configuration and is provided with at least four interruptions, each one covering one of said fall sections during the rotary trajectory, thereby the article units housed inside the housings are supported and slide on said support plane until they fall into their respective drop chutes via one of said interruptions. There have been provided means for selectively stopping some of said interruptions providing a continuation to the stationary support plane depending on the position of the mobile partition walls in the compartments of the drop chute.

Since, depending on the size of the handled articles and, therefore, on said position of the movable partition walls, it is possible to load two or four articles in each drop chute, the machine includes four of said interruptions 9020 equidistant arranged along the circumference of the support plane. The mentioned stopping means comprise two plates which can be placed in two, diametrically opposite one another, of said four interruptions, providing a continuation to the support plane in those zones so as to enable the filling of the two compartments of each drop chute during one turn of the rotary structure, being the mobile partition walls in said sideways position. This is appropriated to handle big or medium sized articles. When it is desired to handle small articles, said plates are removed, thereby the four interruptions are enabled and permit the filling of the four subcompartments of each drop chute during one turn of the rotary structure, being the mobile partition walls in said central position.

In order to synchronize the movements of the first and second diverter plates according to the angular position of the rotary structure with respect to the interruptions of the support plane, the machine of the invention comprises position detection means for detecting the angular position of the rotary structure and emitting a signal representative of said position for activating the actuating means of the diverter plates.

During the adjustment of the housings and/or the end stop and support elements to adapt them to different sizes articles it is convenient to adapt at the same time the mouth of the drop chute. For that purpose, said adjustment means comprise two parts which delimit in the longitudinal direction each housing and in which said end stop and support elements are arranged. At least one of said two parts of each housing is mounted in a mobile fashion and is connected to common actuating means which permit to move at a time all of the mobile parts of all the housings, bringing them closer or moving them away from the other parts. Each drop chute is delimited in the longitudinal direction by two side walls, with at least one of said side walls being made up of a fixed lower portion and a mobile upper portion, pivoting. The wall which includes said mobile portion is placed at the same side than the mobile part of the housing. This mobile upper portion is hinged at its lower end to the upper end of said fixed portion and linked at the other end to the mobile part of the corresponding housing, so that the adjustment of the housings by moving its respective movable parts causes a rotation in the mobile upper portions of the side walls of its corresponding drop chutes, thereby their mouths are adjusted at the same time in a concurrent manner.

As conventional in this kid of rotary machines, the drop chutes have also their bottom walls opened and run over another annular support plane over which the upright positioned articles housed therein slide. The mentioned transfer means for transferring the article units, upright positioned, from said drop chutes to exit transport means comprise typically deflecting blades or the like and a pushing wheel provided with radial blades along its circumference, being provided means to adjust the angular separations between said radial blades.

BRIEF DESCRIPTION OF THE DRAWINGS

These and other characteristics will be better understood from the following detailed description of some embodiments with reference to the accompanying drawings, in which:

FIGS. 2 and 3 are partial side view which show a housing and drop chute assembly according to another embodiment, with its dimensions adjusted to big articles and, respectively, in the consecutive steps of filling of the first and second compartments of the drop chute;

FIGS. 4 to 7 are partial side views which show the housing and drop chute assembly of FIGS. 2 and 3, now with its dimensions adjusted to small articles and, respectively, in the consecutive steps of filling of the first, second, third and fourth subcompartments of the drop chute;

DETAILED DESCRIPTION OF THE EMBODIMENTS

The machine for righting and aligning articles of this invention is of the type suitable for handling articles having a differentiated configuration at one end and a base at the other end, and which define a longitudinal axis between both ends. In the embodiment shown in the figures, these articles are empty bottles A that are lightweight, made from plastic for example, in which said differentiated configuration A1 consists of a neck in which a filling opening can be found, and which include a base A2 at the opposite end thereof. Generally these bottles or containers are designed to stand upright on said base A2, although on certain occasions this is not the case, which is when individual support elements (not shown) are used, normally called pucks. The machine of the invention includes a series of adjustment means which enable articles, for example, bottles A, of different sizes to be handled and production to be increased.

Figure 1:
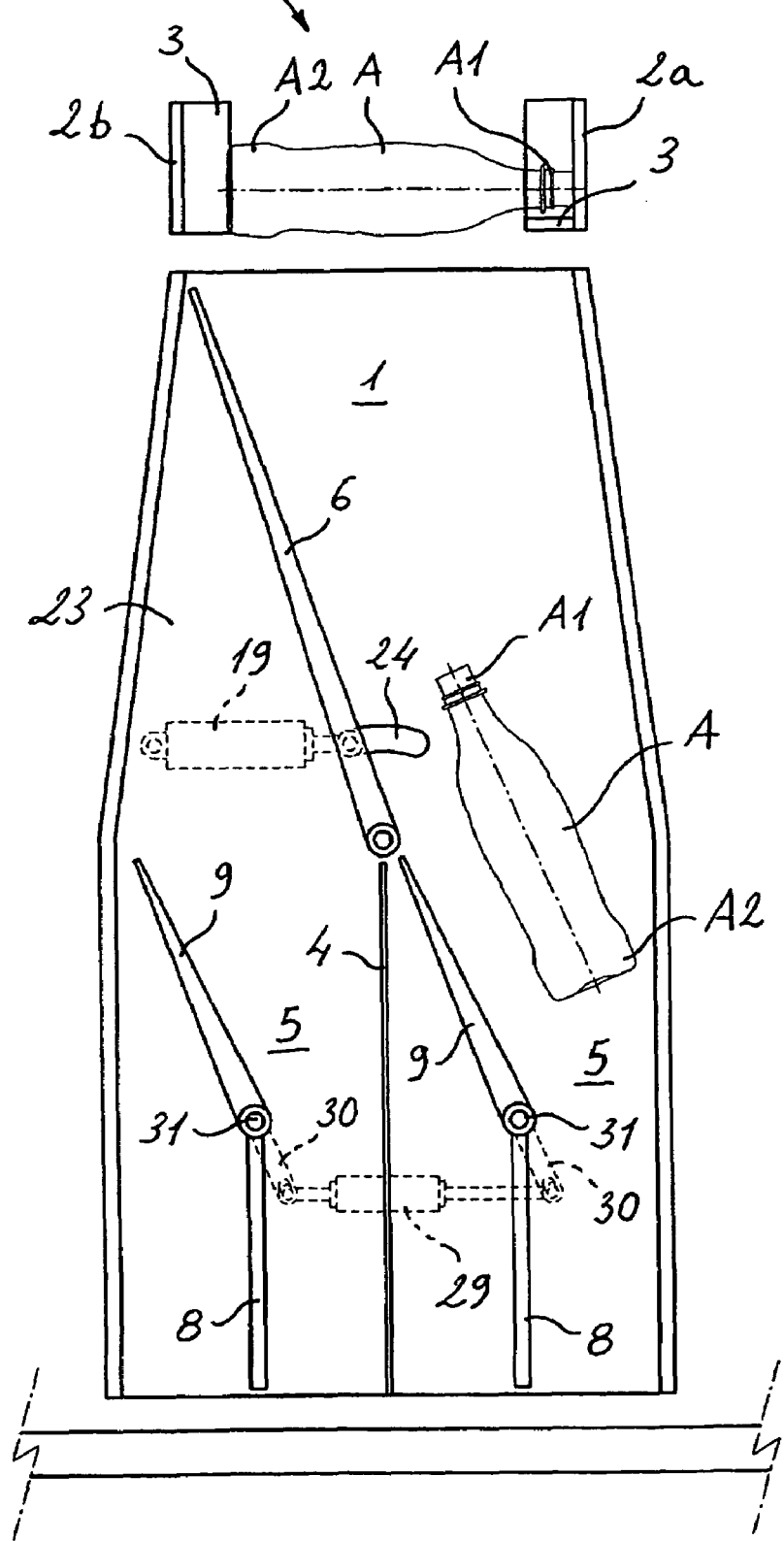
FIG. 1 is a schematic front view of a housing and drop chute assembly according to an basic embodiment of the present invention.

FIG. 1 shows one embodiment of the machine of this invention that comprises at least one drop chute 1 arranged underneath respective housings 2, appropriately sized to receive an article A in a flat position and pre-orientated in the longitudinal direction, in other words, with the longitudinal axis along the housing 2, and the differentiated configuration at one end or the other thereof. The housing 2 has end stops and support elements 3 associated thereto for supporting said differentiated configuration A1 of the article A as it falls so that it is introduced upright into the drop chute 1, that is, with said base A2 at the lower level. A partition wall 4 divides a lower part of the drop chute 1 into two compartments 5, each one of which is capable of housing an article A in the upright position. At the top end of said partition wall 4 there is arranged in a hinged fashion a first diverter plate 6 actuated by actuating means, such as a fluid dynamics cylinder 19, so that it changes position in order to direct the articles A that fall towards one or the other of said compartments 5, in an alternating manner. The drop chute 1 also includes a pair of additional partition walls 8, each one arranged in the lower part of one of the compartments 5, dividing it into two subcompartments 5a that are substantially equal. At the top end of each of said additional partition walls 8 there is a second diverter plate 9 arranged in a hinged fashion, with both second diverter plates 9 being actuated by actuating means, such as a double piston fluid dynamics cylinder 29, so that it changes position in order to direct the articles A that fall towards one or the other of said subcompartments 5a, in an alternating manner. Therefore, the drop chute 1 comprises four subcompartments 5a for four upright articles. When the four subcompartments 5a of the drop chute 1 are full, transfer means (shown in FIG. 8) transfer the articles A from said compartments 5 to exit transfer means 7, in an upright position and aligned in a row.

In the embodiment shown in FIG. 1, said fluids dynamic cylinder 19 is arranged behind an inner wall 23 of the drop chute 1 and connected to said first diverter plate 6 through an elongated arcuate hole 24, while each of the stems of said double piston fluids dynamics cylinder 29 is linked to a lever 30 attached to a rear extension of a hinging axis 31 of one of the two second diverter plates 9, which move together under the action of said double piston fluid dynamics cylinder 29. The actuating sequence of the diverting plates 6, 9 is the same as that described below with reference to FIGS. 4 to 7.

Another embodiment of the machine of this invention comprises a series of drop chutes 1 arranged underneath respective housings 2, appropriately sized to receive an article A in a flat position and pre-orientated in the longitudinal direction, in other words, with the longitudinal axis placed along the housing 2 and with the differentiated configuration in either one end or the other thereof. FIGS. 2 to 7 show only one of said drop chutes 1 placed underneath its corresponding housing 2. Said drop chutes 1 and their respective housings 2 are joined tangentially along the periphery of a rotary structure 10, as shown diagrammatically in FIG. 8. Said rotary structure 10 is actuated to rotate in a certain direction. A central area of the machine is occupied by loading means that comprise a circular structure 13, coaxial with the rotary structure 10 and delimited by at least one circumferential side wall 14 and a bottom wall 15 to receive a plurality of articles A in disorderly arrangement. Between a lower edge of said side wall 14 and the periphery of said bottom wall 15 there is a ring-shaped opening under which move the housings 2, which have their upper faces open. The bottom wall 15 of the container 13 has a conical shape, its height decreasing towards the periphery, and it is joined to actuating means which make said bottom wall 15 rotate coaxially with the rotary structure 10 in a direction that is opposite the rotation direction of said rotary structure. This provides means for directing said articles A to said ring-shaped opening to force that in each housing 2 an article A is introduced in said flat position and pre-orientated in the longitudinal direction.

The housings 2 have their bottom walls open, and between said open bottom walls of the housings 2 and the drop chutes 1 at least one stationary support plane 11 is arranged provided with four interruptions 12, each one of which covers a drop section during the rotary trajectory that the housings 2 undergo. Therefore, the articles A housed in the upright position inside the housings 2 slide on said support plane 11 dragged by the rotary structure 10 until they fall into their respective drop chutes 1 through one of said interruptions 12. The arrangement and utility of said interruptions will be described in greater detail later.

As better shown in FIGS. 2 to 7, each housing 2 is delimited in the longitudinal direction by two parts 2a, 2b on which end stops and support elements 3 are positioned that serve to support said differentiated configuration A1 of the article A during the beginning of its fall, so that first the base A2 falls and the article is introduced in the upright position in the drop chute 1, that is, with said base A2 at the lowest level. One of said two parts 2a of each housing 2 is mobile and is connected to common actuating means to move all the mobile parts 2a of all the housings 2 at the same time, bringing them closer or moving them away from the other parts 2b. Between every consecutive two parts 2a, 2b belonging to different housings an extendible bellow-shape cover 20 is provided. Said means for moving the mobile parts 2a are conventional, and are not shown. As an example, all the mobile parts 2a could be mounted on a substructure (not shown), coaxial to the rotary structure 10, and capable of being moved in an angled manner with respect to said rotary structure to vary the position of all the mobile parts 2a at the same time.

Each drop chute 1 is delimited in the longitudinal direction by two side walls 1a, 1b. One of said side walls 1a is made up of a fixed lower portion 17 and a mobile upper portion 18, with the latter being hinged at its lower end to the upper end of said fixed portion 17 and linked at its other end, by means of a pin 21 inserted into an elongated hole 22, to the mobile part 2a of the corresponding housing 2. In this way, adjusting the mobile parts 2a to different size articles causes a corresponding rotation of the mobile upper portions 18 of the side walls 1a of the drop chutes 1, whereby the dimensions of the mouths thereof adjust in concurrent fashion to the size of the article A.

A partition wall 4 divides a lower part of each drop chute 1 into two compartments 5, each one of which is capable of housing an article A, of either medium of large size, in the upright position. At the upper end of said partition wall 4 there is arranged in a hinged fashion a first diverter plate 6, which is actuated by actuating means, such as a fluid dynamics cylinder 19, so that it changes position in order to direct the articles A that fall towards one or the other of said compartments 5, in an alternating manner. The fluid dynamics cylinder 19 is assembled in a similar way to that described with reference to FIG. 1. In the lower part of each of the compartments 5 a mobile partition wall 8 is provided and actuated so that it can move sideways in order to adapt the width of said compartments 5 to different size articles. A second diverter plate 9 is arranged in a hinged fashion on a top end of each of said mobile partition walls 8 and is actuated by actuating means to change position as required. Consequently, the two mobile partition walls 8 of each drop chute are attached to a mobile support 25 placed behind said inner wall 23 by means of sliding fingers 26 passed through linear guides 27 on the wall 23. A fluid dynamics cylinder 28 actuates the combined movement of both mobile partition walls 8. On said mobile support 25 there is also attached the double piston fluid dynamics cylinder 29, with its stems linked to said levers 30 attached to rear extensions of the hinging axis 31 of the two second diverter plates 9, which move together under the action of said double stem fluid dynamics cylinder 29. Said hinging axes 31 pass through the rear wall 23 by means of respective elongated holes 32. As an alternative example, the mobile partition walls 8 and the second diverter plates 9, together with their actuating means 29, could be mounted on the same coaxial substructure (not shown), as that on which all the mobile parts 2a of the housings 2 would be mounted, as mentioned above.

In FIGS. 2 and 3, the mobile partition walls 8 are in a lateral position, in which each one adapts the width of the respective compartment 5 to a larger size article A, and in which said second diverter plates 9 remain stationary in a position suitable for directing the article that falls towards said adapted compartments 5. Initially, the first diverter plate 6 is tilted to one side of the drop chute 1 and, during one turn, as will be explained below, a first article A falls through a first interruption 12 of the support plane 11 inside a first compartment 5 (FIG. 2). Next, the first diverter plate 6 changes position due to the action of the fluid dynamics cylinder 19 and a second article A falls through a second interruption 12 of the support plane 11 inside a second compartment 5 (FIG. 3), whereby the drop chute 1 is completely full. The drop chute 1 has its bottom wall open and the articles A placed in the upright position are dragged by the rotary structure 10 sliding on a second stationary support plane 33. Before this same turn ends, transfer means (see FIG. 8) including one or more deflecting blades 34 and a pushing wheel 35, transfer the articles A from said compartments 5 to exit transport means 7 in an aligned arrangement.

In FIGS. 4 to 7, the mobile partition walls 8 are in a central position, in which each one divides the respective compartment 5 into two equal subcompartments 5a, each one capable of housing a smaller size article A. Here both the first diverter plate 6 and the second diverter plates 9 are actuated to change position in an alternating manner to direct the articles A that fall towards one or the other of said subcompartments 5a. Initially, the first diverter plate 6 is tilted to one side of the drop chute 1 and, during one turn, a first article A falls through a first interruption 12 of the support plane 11 inside a first subcompartment 5a (FIG. 4). Next, the second diverter plates change position due to the action of the fluid dynamics cylinder 29 and a second article A falls through a second interruption 12 of the support plane 11 inside a second subcompartment 5a (FIG. 5). Next, the first diverter plate 6 changes position due to the action of the fluid dynamics cylinder 19 and a third article A falls through a third interruption 12 of the support plane 11 inside a third subcompartment 5a (FIG. 6). Finally, the second diverter plates change position due to the action of the fluid dynamics cylinder 29 and a fourth article A falls through a fourth interruption 12 of the support plane 11 inside a fourth subcompartment 5a (FIG. 7), whereby the drop chute 1 is completely full. Before this same turn finishes, said transfer means transfer the articles A from said subcompartments 5a to said exit transport means 7 in an aligned arrangement.

In order to adapt the support plane 11 to two or four openings, the machine comprises means for selectively stopping some of said interruptions 12 providing a continuation to the stationary support plane 11 depending on the position of the mobile partition walls 8 in the compartments 5 of the drop chute 1. The four interruptions 12 are equidistant along the support plane 11 (see FIG. 8), with said stopping means consisting in two plates 16 that can be placed in two of said interruptions 12, diametrically opposite, providing a continuation to the support plane 11 in those areas, so that only two interruptions 12 separated by 180° remain useable. This situation enables the filling of the two compartments 5 of each drop chute 1 during one turn, with the mobile partition walls 8 in said lateral position. With the plates 16 withdrawn, the four interruptions 12 are useable to enable the filling of the four subcompartments 5a of each drop chute 1 during one turn, with the mobile partition walls 8 being in said central position. The plates 16 are placed and withdrawn manually by means of elongated windows (not shown) provided for this effect in said circumferential side wall 14 of the machine.

In order to detect the angular position of the rotary structure 10 with respect to said fall sections, that is, the position of the drop chute 1 and housing 2 ensembles in relation to the interruptions 12, position detecting means are provided that are adapted to emit a signal representative of the angular position detected. This signal, conveniently processed by an electronic control centre, is used to activate said actuating means of the first and second diverter plates 6, 9 according to the angular position of each housing 2 and drop chute 1 in relation to the successive interruptions.

Figure 8:
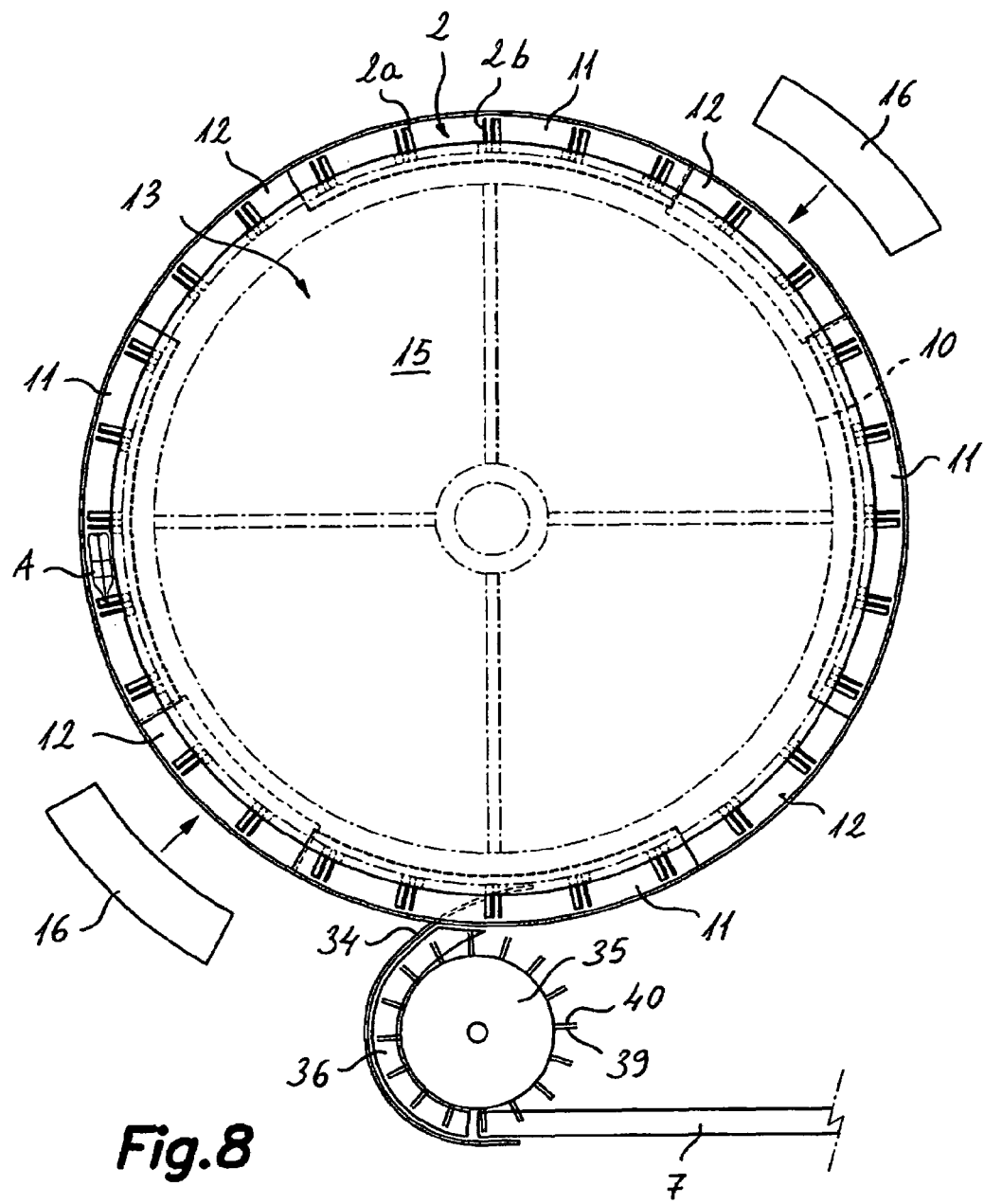
FIG. 8 is a schematic plan view of the machine of the present invention according to an embodiment which comprises a rotary structure, where there are shown the interruptions of the support plane and the transfer means for transferring the articles from the drop chutes to exit transport means.

Adjusting the housings 2 and compartments 5 to different size articles A also requires an adjustment of said pushing wheel 35 of the exit transfer means. As shown in FIG. 8, said transfer means comprise one or two deflecting blades 34 for deflecting the articles A arranged upright in the drop chutes 1 from their rotary trajectory to a static, curved support track 36, external to the body of the machine, on which articles A can slide. The pushing wheel 35 is provided with radial blades 39, 40 for pushing articles A along said curved support track 36 until it deposits them on an exit transporter 7, for example like a continuous feed belt. Said pushing wheel 35 is actuated by actuating means so that its blades 39, 40 rotate at the same tangential speed as the drop chutes of the rotary structure 10.

Figure 9:
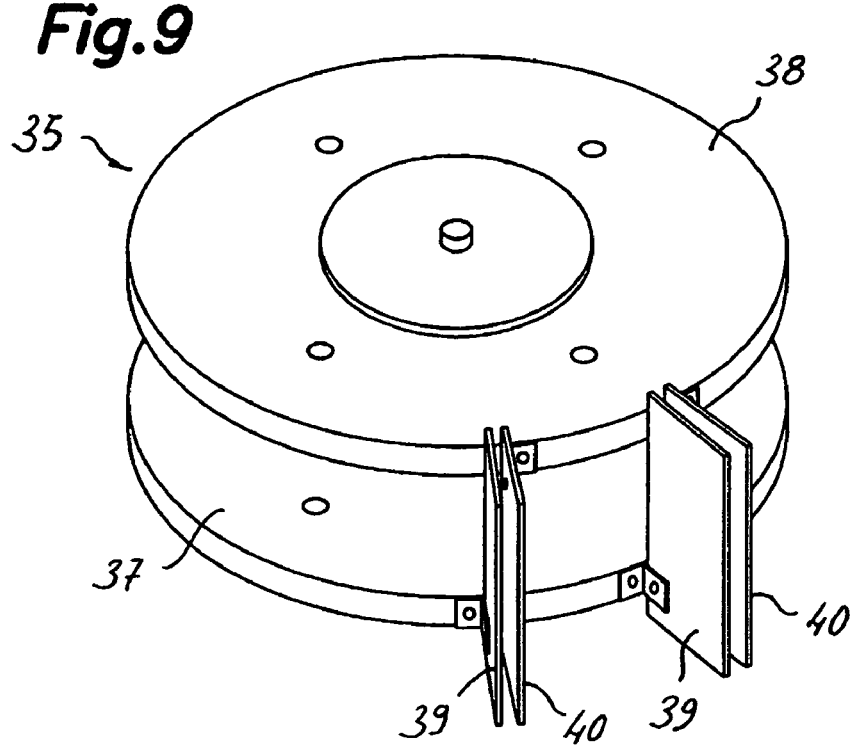
FIGS. 9 and 10 are perspective views of a pushing wheel, with adjustable separation blades, forming part of the exit transfer means.
Figure 10:
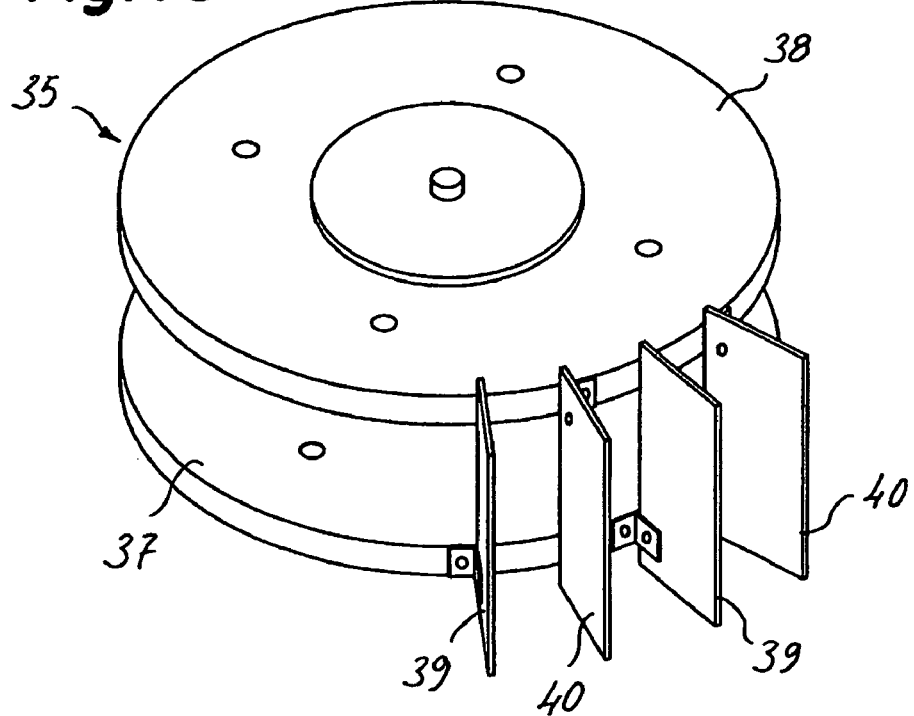

With reference now to FIGS. 9 and 10, the pushing wheel 35 is made up of first and second coaxial circular structures 37, 38, and the blades consist in first radial blades 39 attached to said first circular structure 37 and second radial blades 40 attached to said second circular structure 38, arranged at regular angular separations along their respective circumferences, so that the first and second radial blades 39, 40 are interconnected in an alternating manner. FIGS. 9 and 10 only show two pairs of first and second radial blades 39, 40 in the interest of greater clarity of the drawings. Means are provided for adjusting the relative angular position between both the first and second coaxial, circular structures 37, 38 in order to vary the separations between said first and second radial blades 39, 40 to adapt them to different size articles A, according to the adjustment of the housings 2 and the compartments 5. With the adjustment shown in FIG. 9, the first and second radial blades 39, 40 are paired, very close together, providing other large spaces, which are useful spaces corresponding to the adjustment of the compartments 5 shown in the FIGS. 2 and 3. With the adjustment shown in FIG. 20, the first and second radial blades 39, 40 are separated at angular intervals leaving all the small useful spaces, which correspond to the adjustment of the compartments 5 shown in the FIGS. 4 to 7, that is, forming four subcompartments 5a in each drop chute. Any other intermediate adjustments are possible.

The preceding embodiment is merely illustrative and not limiting, and a person skilled in the art will be able to devise numerous variations and modifications without departing from the scope of this invention, which is defined by the attached claims.

The invention claimed is:

1. Machine for righting and aligning articles using drop chutes comprising multiple compartments, said articles (A) being of the type having a differentiated configuration (A1) at one end and a base (A2) at the other end, and said machine being of the type comprising:

at least one drop chute (1) arranged under a housing (2) designed to receive from loading means an article (A) in a flat position, pre-orientated in the longitudinal direction and let it fall in this position into said drop chute (1):

end stop and support elements (3) associated with said housing (2) to support said differentiated configuration (A1) of the article (A) as it falls so that it is introduced in the upright position in the drop chute (1), in other words, with said base (A2) at the lowest level;

a partition wall (4) that divides a lower part of the drop chute (1) into two compartments (5), and a first diverter plate (6), arranged in a hinged fashion on an upper end of said partition wall (4) and actuated by actuating means to change position in order to direct the articles (A) that fall towards one and the other of said compartments (5), in an alternating manner; and transfer means to transfer the articles (A) from said compartments (5) to exit transport means (7) in an aligned fashion;

characterised in that it comprises a pair of additional partition walls (8), each one arranged in the lower part of one of the compartments (5) dividing it into two subcompartments (5a) that are substantially equal, each one capable of housing an article (A) in the upright position, and a pair of second diverter plates (9), each one arranged in a hinged fashion on an upper end of one of said additional partition walls (8) and actuated by actuating means to change position in order to direct the articles (A) that fall towards one and the other of said subcompartments (5a), in an alternating manner, whereby the drop chute (1) comprises four of said subcompartments (5a).

2. Machine according to claim 1, characterised in that it comprises adjustment means for adapting the dimensions of the housing (2) and/or the positions of said end stop and support elements (3) present therein to different size articles; and in that said pair of additional partition walls are mobile partition walls (8) actuated by actuating means to move sideways in order to adapt the width of said compartments (5) to different size articles in coordination with said adjustment means, said mobile partition walls (8) being able to move between:

a central position, in which each one divides the respective compartment (5) into two equal subcompartments (5a), each one capable of housing a smaller article (A) and in which said second diverter plates (9) are actuated in order to change position in an alternating manner so as to direct the articles (A) that fall towards one and the other of said subcompartments (5a); and at least one sideways position, in which each one adapts the width of the respective compartment (5) to a bigger article (A), and in which said pivoting diverter plate (9) remains stationary in a suitable position to direct the article that falls towards said adapted compartment (5).

3. Machine according to claim 2, characterised in that it comprises a series of drop chutes (1) and respective housings (2) joined tangentially along the periphery of a rotary structure (10) the central part of which comprises at least part of said means for loading the articles (A) in the housings (2), with temporary retention means (11) being provided to retain the articles (A) in the housings (2) during a part of the rotating trajectory thereof and letting them fall into their respective drop chutes (1) in one of several drop sections arranged along said rotating trajectory.

4. Machine according to claim 3, characterised in that said temporary retention means (11) have at least one stationary support plane (11) arranged between open bottom walls of the housings (2) and the drop chutes (1), with said stationary support plane (11) being provided with at least four interruptions (12), each one covering one of said fall sections during the rotary trajectory, on which support plane (11) slide articles (A) housed inside the housings (2) until they fall into their respective drop chutes (1) via one of said interruptions (12).

5. Machine according to claim 4, characterised in that it comprises means for selectively stopping some of said interruptions (12) providing a continuation to the stationary support plane (11) depending on the position of the mobile partition walls (8) in the compartments (5) of the drop chute (1).

6. Machine according to claim 5, characterised in that it comprises four of said interruptions (12) arranged equidistantly along the support plane (11), which is ring shaped, and in that said stopping means comprise two plates (16) which can be placed in two of said interruptions (12), diametrically opposite one another, providing a continuation to the support plane (11) so as to enable the filling of the two compartments (5) of each drop chute (1) during one turn of the rotary structure (10) when the mobile partition walls (8) are in said sideways position, or removed so as to enable the filling of the four subcompartments (5a) of each drop chute (1) during one turn of the rotary structure (10) when the mobile partition walls (8) are in said central position.

7. Machine according to claim 3, characterised in that said adjustment means for adapting the dimensions of each housing (2) and/or the positions of said end stops and support elements (3) comprise two parts (2a, 2b) which delimit in the longitudinal direction each housing (2) and in which said end stop and support elements (3) are arranged, with at least one of said two parts (2a) in each housing (2) being mobile and connected to common actuating means for moving the mobile parts (2a) of all the housings (2) bringing them closer or moving them away from the other parts (2b).

8. Machine according to claim 7, characterised in that each drop chute (1) is delimited in the longitudinal direction by two side walls (1a, 1b), with at least one of said side walls (1a) being made up of a fixed lower portion (17) and a mobile upper portion (18) hinged at one end to the upper end of said fixed portion (17) and linked at the other end to the mobile part (2a) of the corresponding housing (2), so that by adjusting the mobile parts (2a) to different size articles causes a rotation in the mobile upper portions (18) of the side walls (1a) of the drop chutes (1) in order to adjust the dimensions of the mouths thereof in a concurrent manner.

9. Machine according to claim 3, characterised in that it comprises position detection means for detecting the angular position of the rotary structure (10) with respect to said drop sections and means for activating said actuating means of the first and second diverter plates (6, 9) according to the detected angular position of the rotary structure (10).

10. Machine according to claim 3, characterised in that said position detection means are adapted for emitting an electrical or electronic signal that is representative of said detected angular position, which is used to activate said actuating means of the first and second diverter plates (6, 9) according to the detected angular position of the rotary structure (10).

11. Machine according to claim 3, characterised in that said loading means comprise a circular container (13), which is coaxial with the rotary structure (10) and delimited by at least one circumferential side wall (14) and a bottom wall (15) in order to receive a series of articles (A) in a disorderly arrangement, with a ring-shaped opening being provided between a lower edge of said side wall (14) and the periphery of said bottom wall (15) under which slide the housings (2), which have their top faces open, and means for directing said articles (A) towards said ring-shaped opening so that they are introduced into the housings (2) in said flat position, pre-orientated in the longitudinal direction.

12. Machine according to claim 11, characterised in that said means for directing the articles (A) towards the ring-shaped opening have a conical shape for said, bottom wall (15) of the container (13), which decreases in height towards the periphery, and actuating means for rotating said bottom wall (15) coaxially with the rotary structure (10) in a direction opposite the rotary direction of said rotary structure.

13. Machine according to claim 3, characterised in that said transfer means comprise one or more deflecting blades (34) for diverting the articles (A) from their rotary trajectory in the drop chutes (1) to a static, curved support track (36), on which slide the articles (A) pushed by a pushing wheel (35) rotated by actuating means until it deposits the articles on exit transport means (7), like a continuous feed belt.

14. Machine according to claim 13, characterised in that said pushing wheel (35) comprises first and second coaxial circular structures (37, 38) and is provided with first and second radial blades (39, 40) attached respectively along the circumference of said first and second coaxial circular structures (37, 38) in an alternating manner, with means being provided to adjust the relative angular position between both the first and second coaxial, circular structures (37, 38) in order to adapt the separations between said first and second radial blades (39, 40) to different size articles (A), according to the adjustment of the housings (2) and compartments (5).

\* \* \* \* \*